Feb. 11, 1947. E. E. JOHNSON 2,415,497
VOLUME CONTROL CONSTRUCTION
Filed Aug. 18, 1944

INVENTOR
ESMOND E. JOHNSON
BY
Blair, Curtis + Hayward
ATTORNEYS

Patented Feb. 11, 1947

2,415,497

UNITED STATES PATENT OFFICE 2,415,497

VOLUME CONTROL CONSTRUCTION

Esmond E. Johnson, Upper Darby, Pa., assignor to International Resistance Company, Philadelphia, Pa., a corporation of Delaware Application August 18, 1944, Serial No. 550,111

3 Claims. (Cl. 188—83)

This invention relates to a rheostat suitable for volume or tone control in radio.

An object of this invention is to provide such a volume control structure which may be easily produced with minimum expenditure. Another object is to provide such a control which is practical, simple and well able to withstand hard usage. Another object is to provide such a control which is particularly suited for use in radio equipment installed in conveyances, such as airplanes, where there is marked vibration from engines or other sources. Another object is to provide such a control in which any desired adjustment may be maintained regardless of the shocks and vibrations the control may be subject to. Another object is to provide a control able to hold its adjustment under adverse conditions and which is wear-resistant so that it will give reliable operation over an extended period of time. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing in which is shown one of the various possible embodiments of this invention:

Similar reference characters refer to similar parts throughout the several views of the drawing.

As conducive to a clearer understanding of certain important features of this invention, it might here be pointed that radio equipment now being built must be able to withstand substantial shocks as well as continuous vibration. Such equipment is installed in various types of war vehicles, such as airplanes, boats, gun carriers, tanks, etc., where the engine vibration is considerable and where shocks may be heavy, particularly when in action. In such apparatus it is vital to have the various adjustable parts, such as the volume controls, hold adjusted positions. Many volume controls include a resistance strip which has a smooth surface and a brush arm or armature in contact therewith. The brush arm moves about the resistance strip by rotation of the shaft. The friction between the brush and the strip is relatively small. Consequently when subject to vibration, the brush is apt to move along the strip, and this results in a change of volume control adjustment. Attempts to cure this difficulty include the provision of some frictional element disposed between the end of the shaft and the inside of the casing. This element is usually formed from some composition such as rubber and is therefore subject to operative change during use. Thus after a time, it may become useless, or at least will not prevent change of adjustment where there is heavy vibration. One of the objects of this invention is to provide a structure in which the above-mentioned difficulties are successfully overcome.

Figure 1:
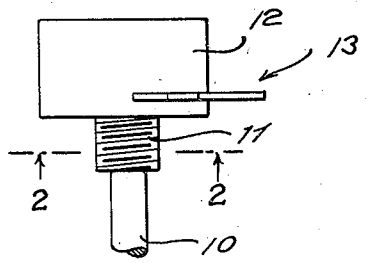
Figure 1 is a fragmentary elevation of a volume control having the invention incorporated therein.

Referring now to Figure 1, there is shown a volume control of the usual construction and including a smooth resistance element and contacting brush arm (not shown). The brush arm is rotated by a shaft 10 extending into a bushing 11. The brush arm and the resistance element are enclosed within the casing 12, and suitable terminals generally indicated at 13 extend from the casing.

Figure 3:
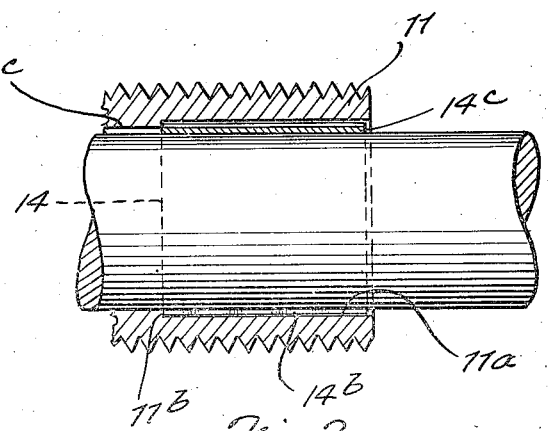
Figure 3 is a fragmentary longitudinal section through the bushing and shaft of the volume control, the shaft being shown in elevation.

Turning to Figure 3, the bushing 11 is undercut to provide an interior portion 11a extending from the bottom of the bushing, as viewed in Figure 1, and terminating in a shoulder 11b formed by a smaller interior portion 11c of the bushing. Accordingly, the shoulder 11b faces the open end of the bushing or the bottom end as viewed in Figure 1.

Figure 5:
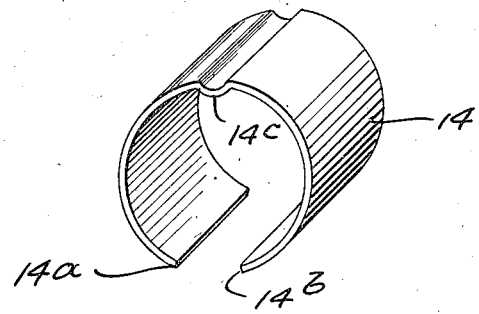
Figure 5 is a perspective of one of the parts of the volume control.

As best seen in Figure 5, there is provided a cylindrical, frictional element 14 whose ends 14a and 14b are spaced with a longitudinal opening therebetween. A longitudinal projection 14c is stamped or otherwise formed in the top of the frictional element, as viewed in Figure 5, i. e., opposite the space between the ends 14a and 14b. Thus the projection 14c is convex to the inner surface of the element 14 and concave to the outer surface thereof. The length of the element 14 is approximately equal to the axial dimension of the enlarged portion 11a (Figure 3) of the bushing 11, and element 14 is preferably formed from a resilient material such as spring steel or beryllium copper.

Figure 2:
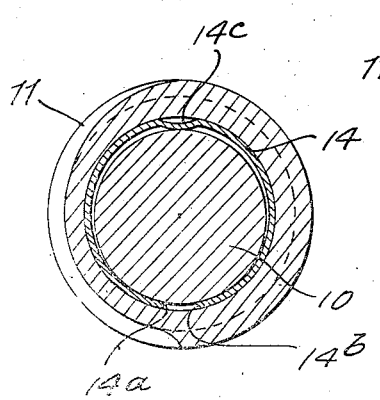
Figure 2 is a transverse sectional view taken along the line 2—2 of Figure 1.
Figure 4:
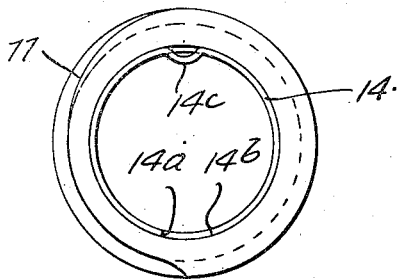
Figure 4 is a sectional view similar to Figure 2 before the shaft is inserted in the bushing.

During assembly and before insertion of the shaft 10 and connected parts, the frictional element 14 is inserted in the enlarged portion 11a of the bushing to assume the position shown in Figures 2, 3, and 4. Thus the entire length of the element fits within enlarged portion 11a of the bushing and in transverse cross section the element which is larger in diameter than portion 11a assumes the position shown in Figure 4. Due to the larger diameter of the element 14 and the resilient character thereof, the two sides of the element extending from the projection 14c press firmly against the inner surface of the bushing. The parts in this position are so proportioned that the distance between the bottom surface of the projection 14c (Figure 4) and a point on the line continuing the inner surface of the element directly therebeneath is shorter than the diameter of the shaft 10.

Accordingly, upon insertion of the shaft 10 so that it is forced through the element 14, the projection 14c flattens somewhat (Figure 2). It will be understood that it is not necessary to assemble the parts in this sequence; the shaft can be inserted first, the element 14 being forced in subsequently. When the shaft 10 presses and partially flattens projection 14c, it presses against the shaft, and the ends 14a and 14b are forced toward each other to press against this part of the shaft. Accordingly, the action of forcing the shaft into assembled position not only creates a pressure on the top of the shaft, as viewed in Figure 2, due to the flattening of the projection, but also on the bottom part of the shaft as the ends 14a and 14b move toward each other.

As assembled, the element 14 is in position to press with considerable force against the bushing 11 and the shaft 14. The sides of the element 14 are pressed firmly against the adjacent portions of the bushing due to the pressure exerted by the shaft. At the same time the projection 14c and the ends 14a and 14b press against the shaft as described above. Inasmuch as the control must be adjusted by rotation of the shaft which means relative movement of the bushing 11 and the shaft, there is created a considerable friction between these parts. This friction may be varied to meet any desired specifications by a variation in the size of the parts as well as the resiliency of the frictional element. Thus the friction may be such that it will not impede easy operation of the control and yet will prevent movement of the shaft after an adjustment is made in spite of any vibrations or shocks occurring during use of the control.

Accordingly, the several objects hereinabove referred to have been successfully accomplished and in a practical manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In a volume control structure, in combination, a bushing having a bore for the rotative support of a shaft, a shaft extending therethrough, said bore having an enlarged section, and a cylindrical, frictional element extending about said shaft within said enlarged portion of said bore in the bushing to press against said shaft and said bushing, said element being split longitudinally and having a longitudinal ridge running parallel to the shaft axis and extending inwardly opposite said split.

2. In a volume control structure, in combination, a bushing, a shaft extending therethrough, and a cylindrical, frictional element extending about said shaft within said bushing to press against said bushing and said shaft, said element being split longitudinally and having a longitudinal ridge extending inwardly opposite said split, the distance between the inner surface of the ridge and a line continuing the inner surface of the element opposite thereto being smaller than the diameter of the shaft before insertion of the shaft.

3. In a volume control structure, in combination, a bushing including an undercut portion of enlarged diameter, a shaft extending therethrough, and a cylindrical clip fitting within said enlarged portion and having circumferentially-spaced ends, the inner surface of said clip being smaller than the diameter of said shaft, there being a longitudinal projection on said clip between the ends thereof to press against the shaft.

ESMOND E. JOHNSON.

REFERENCES CITED

The following references are of record in the file of this patent:

UNITED STATES PATENTS

| Number | Name | Date |
|---|---|---|
| 2,157,091 | Baisch | May 9, 1939 |
| 784,272 | Nagle | Mar. 7, 1905 |
| 1,481,669 | Justice | Jan. 22, 1924 |
| 1,509,523 | Monosmith | Sept. 23, 1924 |
| 1,588,039 | Monosmith | June 8, 1926 |
| 1,574,715 | Warner | Feb. 23, 1926 |
| 1,780,172 | Cramer | Nov. 4, 1930 |
| 2,354,581 | De Jong | July 25, 1944 |

FOREIGN PATENTS

| Number | Country | Date |
|---|---|---|
| 546,462 | German | Mar. 19, 1932 |